United States Patent [19]

Smith et al.

[11] 4,178,358
[45] Dec. 11, 1979

[54] SULFUR PLANT HEATUP PROCESS

[75] Inventors: George E. Smith, Parsippany, N.J.;
Gregory L. Lorimor, Arvada, Colo.;
Peter J. DeKluyver, Fullerton; Henry
E. McFarlin, Placentia, both of Calif.

[73] Assignee: Conoco, Inc., Ponca City, Okla.

[21] Appl. No.: 934,238

[22] Filed: Aug. 16, 1978

[51] Int. Cl.$^2$ .............................................. C01B 17/04
[52] U.S. Cl. .................................. 423/574 R; 432/2;
432/4
[58] Field of Search ............... 423/573, 574, 576, 659,
423/DIG. 6; 432/2, 4, 198, 199

[56] References Cited

U.S. PATENT DOCUMENTS

| Re. 25,469 | 10/1963 | MacDonnell et al. | 432/4 |
| 1,789,187 | 1/1931 | McFarland | 432/4 |
| 3,366,455 | 1/1968 | Childers et al. | 423/574 |
| 3,719,744 | 3/1973 | Seruasier | 423/574 |

FOREIGN PATENT DOCUMENTS 726489  3/1955  United Kingdom ..................... 423/659

OTHER PUBLICATIONS

Audas, P.G.; "Coke and Gas"; Jul. 1951; pp. 229–234.
Nafen et al.; "Chemical Engineering Progress" vol. 69; Dec. 1973; pp. 29–34.

*Primary Examiner*—G. O. Peters
*Attorney, Agent, or Firm*—Richard W. Collins

[57] ABSTRACT

A process for heating up a sulfur recovery plant such as a Claus unit or a combined Claus and SCOT unit, the process including first purging the plant with inert gas and blocking in the purged plant, followed by circulating heated inert gas through the plant to bring the plant to start-up temperature.

4 Claims, 3 Drawing Figures

SULFUR PLANT HEATUP PROCESS

BACKGROUND OF THE INVENTION

1. Field of the Invention

This invention relates to sulfur recovery plants of the type used to recover sulfur from petroleum refinery gas streams containing hydrogen sulfide. Refinery feedstocks are increasingly of the high sulfur type, and as environmental considerations require production of low sulfur fuels and fuel oils, the need for recovery of hydrogen sulfide from petroleum refinery gas streams has increased.

The sulfur recovery process most suited for refinery acid gas cleanup is the vapor phase or modified Claus process. Of the processes capable of handling hydrogen sulfide rich, hydrocarbon laden acid gas, the modified Claus process is the most reliable and the easiest to operate. In some cases, such as where stringent pollution codes are in effect, the addition of a Shell Claus off-gas treating (SCOT) process is generally employed. The SCOT process for cleanup of tail gas from a Claus unit is popular because it uses equipment and technology with which refinery operating personnel are familiar.

2. Prior Art

The primary objective in starting up a sulfur recovery plant is to get the unit on stream in minimum time without exceeding acceptable pollution levels. Exposure of the environment to hydrogen sulfide and sulfur dioxide is greatest during start-up. The first step of the start-up process is the plant heat-up. Heat-up is conventionally carried out by burning fuel gas with injected air in the reaction furnace and in in-line burners if they exist. Excess air is required to completely burn the fuel gas to carbon dioxide. Without excess air, carbon is deposited in the plant equipment. However, excess air can react with residual sulfur, carbon and iron pyrites generating dangerously high temperatures. Sulfur dioxide formed from burning sulfur is a pollutant, and sulfur trioxide (formed with high excess air and high temperature) is corrosive with water. Generally, it is preferred to use a low amount of excess air and to take the resulting carbon lay-down.

Heat-up procedures utilizing inert gas are described in U.S. Pat. Nos. 3,366,455 and 3,617,221. However, these processes do not eliminate oxygen, and the inert gas is merely used as a heat sink to lower the temperature of the products of combustion. U.S. Pat. No. 3,719,744 describes a process including flushing a sulfur recovery unit with steam to remove condensed sulfur prior to shut-down of the unit.

Prior to this invention, there has been no process available for heating up a sulfur recovery unit which did not involve the introduction of oxygen into the unit.

SUMMARY OF THE INVENTION

According to the present invention, the heat-up step in the start-up process of a modified Claus sulfur recovery plant is accomplished without the requirement for introduction of oxygen into the unit. To accomplish this, an inert gas such as nitrogen is used to first purge the oxygen from the system. Once the system is purged, the sulfur recovery unit is blocked in, the inert gas is heated, and the inert gas is circulated through the plant in a closed loop manner.

DESCRIPTION OF THE PREFERRED EMBODIMENTS

The most preferred embodiment of the invention will be described with reference to FIG. 1.

Figure 1:
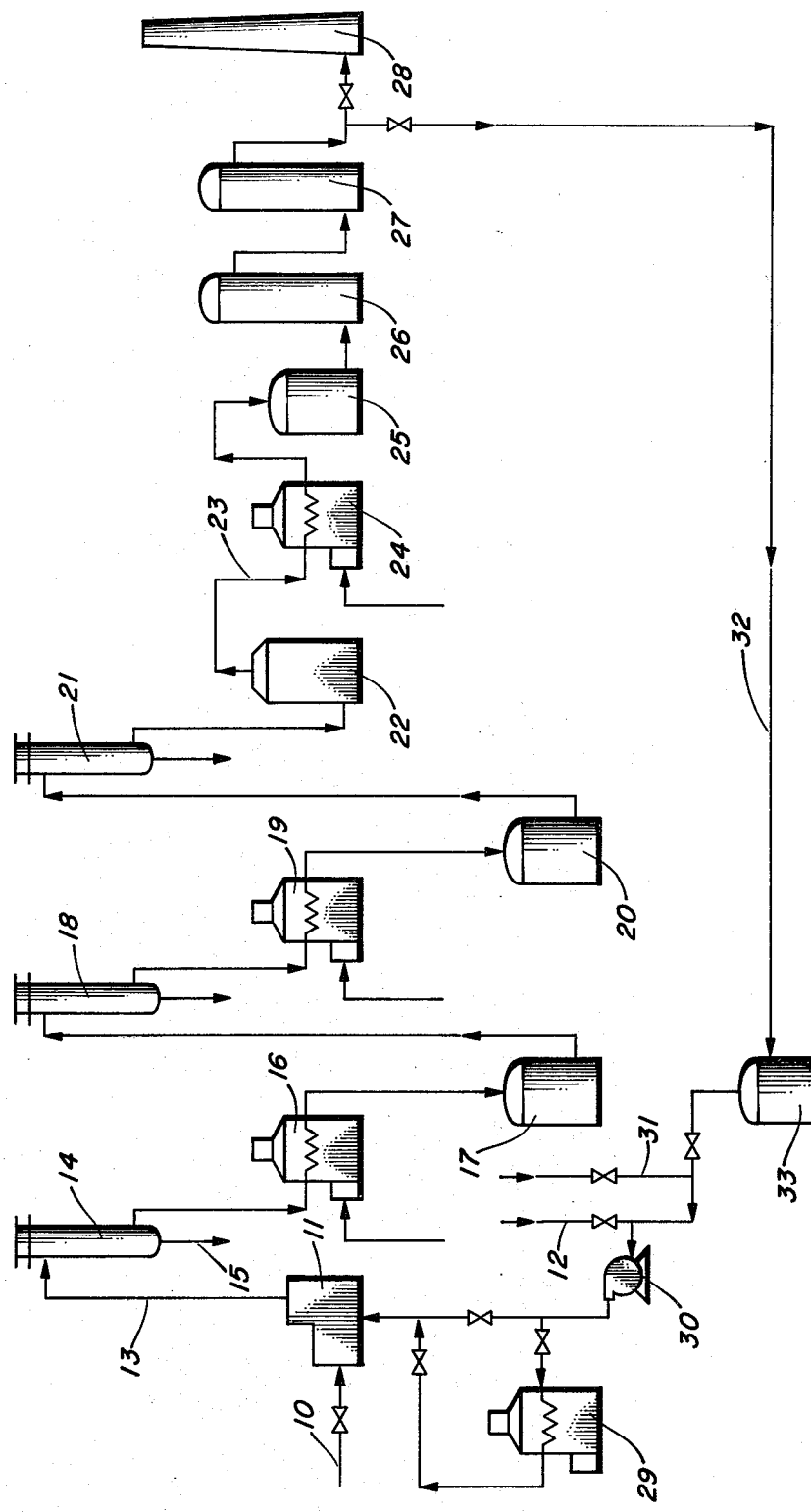
FIG. 1 is a schematic flow diagram illustrating a preferred version of the invention.

FIG. 1 illustrates a conventional sulfur recovery plant of the modified Claus type coupled with a SCOT unit for treating the tail gas from the Claus unit. Feed gas to the process, typically from 40 to 90 percent hydrogen sulfide and the balance light hydrocarbons, carbon dioxide and water, is fed through line 10 to a reaction furnace and waste heat boiler 11 where it is partially combusted with air introduced through line 12. The effluent combustion products from the reaction furnace are taken through line 13 to condenser 14 where liquid elemental sulfur is condensed out and withdrawn through line 15. The vapors from condenser 14 then pass to in-line furnace 16 where they are heated and subsequently passed to reactor 17. The effluent from reactor 17 passes to condenser 18 where additional elemental sulfur is condensed, and the vapors then pass to in-line furnace 19 and reactor 20 for still further conversion. The effluent vapors from reactor 20 pass to condenser 21 and then to coalescer 22. The section of the plant described to this point constitutes a conventional vapor phase or modified Claus unit.

The SCOT unit for treating the tail gas from the Claus unit receives the tail gas from coalescer 22 through line 23. This tail gas is heated in furnace 24 and fed to a reactor 25. The effluent gas from reactor 25 passes through a quench tower 26 and an absorber tower 27 and ultimately to incinerator stack 28.

The sulfur recovery plant as described to this point is conventional, although it will be appreciated that numerous variations and modifications could be incorporated in the plant. For example, tail gas treating units other than SCOT units may be employed.

In order to enable the heat-up procedure in accordance with the invention to be carried out, an inert gas furnace 29 is provided between blower 30 and reaction furnace 11. Inert gas feed to blower 30 is provided through line 31. An inert gas return line 32 is provided with a drum separator 23 to remove entrained liquid from the circulating gas and to prevent liquid from entering blower 30. The inert gas circulating portion of the plant as illustrated in FIG. 1 results in the circulating inert gas being at or near ambient temperature at the time it enters the inlet of blower 30, eliminating the need for a blower having high temperature capability. The heating of the inert gas is downstream from the blower, and by the time it has circulated through the Claus and SCOT units, it has been cooled by the quench tower and absorber tower as is apparent from FIG. 1. Preferably, the gas at the blower inlet is at a temperature of not more than 50° C.

The heat-up process in accordance with the process of the invention will now be described with reference to FIG. 1. Inert gas, preferably nitrogen, is introduced into the system through inert gas feed line 31 to the inlet of blower 30 until the Claus and SCOT units are adequately purged. In the purging step, the inert gas may be vented out the incinerator stack or through other appropriate outlets. The plant is then blocked in, and inert gas from blower 30 is passed through inert gas furnace 29 where it is heated and then passed through reaction furnace and waste heat boiler 11. The inert gas then passes serially through the Claus unit and the SCOT unit. The in-line furnaces 13 and 16 are used to bring the temperature of the circulating gas up to the level needed to preheat the reactors 17 and 20. During the heat-up, the system is maintained in a blocked-in condition and the inert gas is circulated through line 32 back to blower 30 and inert gas furnace 29 until the entire sulfur recovery plant has reached start-up temperature.

After the plant has reached start-up temperature, the inert gas furnace 29 is shut down and isolated. Air is introduced through blower 30 to reaction furnace 11 where it is mixed with acid gas from feed line 10 and the actual sulfur recovery process is initiated. It will be appreciated that the inert gas circulation system in accordance with the invention can also be used during shut-down of the sulfur recovery plant to minimize pollution and undesirable reactions.

Figure 2:
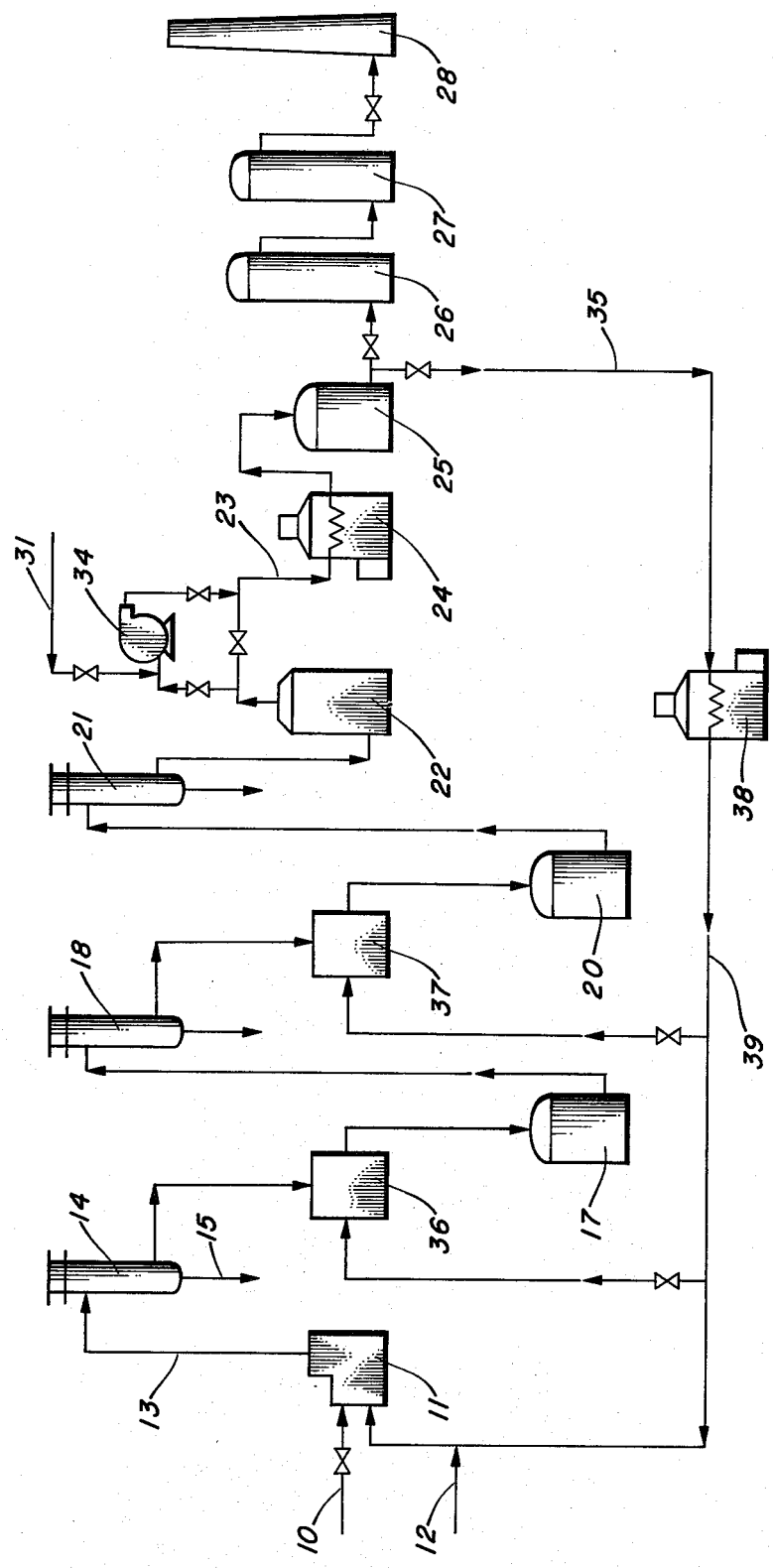
FIG. 2 is a schematic flow diagram illustrating an alternative version of the invention.

An alternative embodiment of the invention is illustrated in FIG. 2. Many of the same components are utilized in this version as are used in the version illustrated in FIG. 1. However, in the embodiment shown in FIG. 2, inert gas blower 34 is provided between coalescer 22 and SCOT furnace 24. Also, inert gas recirculation line 34 connects with the effluent line from SCOT reactor 25 such that the circulating gas does not go through a quench tower or an absorber tower. An additional difference is that in-line heaters 36 and 37 are provided between the condensers and reactors in the Claus unit instead of the in-line furnaces used in the embodiment shown in FIG. 1. The in-line furnaces indirectly heat the circulating gas, and the in-line heaters heat the circulating gas directly. These in-line heaters 36 and 37 blend hot inert gas from line 39 between inert gas furnace 38 and reactor furnace 11 directly with the circulating gas stream between the condensers and reactors rather than by using fired furnaces as in the embodiment in FIG. 1. Whether the circulating gas is heated indirectly or directly is a matter of choice, and either method is satisfactory for heating the relatively cool gas from the Claus condensers to a temperature high enough to heat up the Claus reactors. Other than the differences described above, the procedure utilizing the version illustrated in FIG. 2 is essentially identical to that described with reference to FIG. 1.

Figure 3:
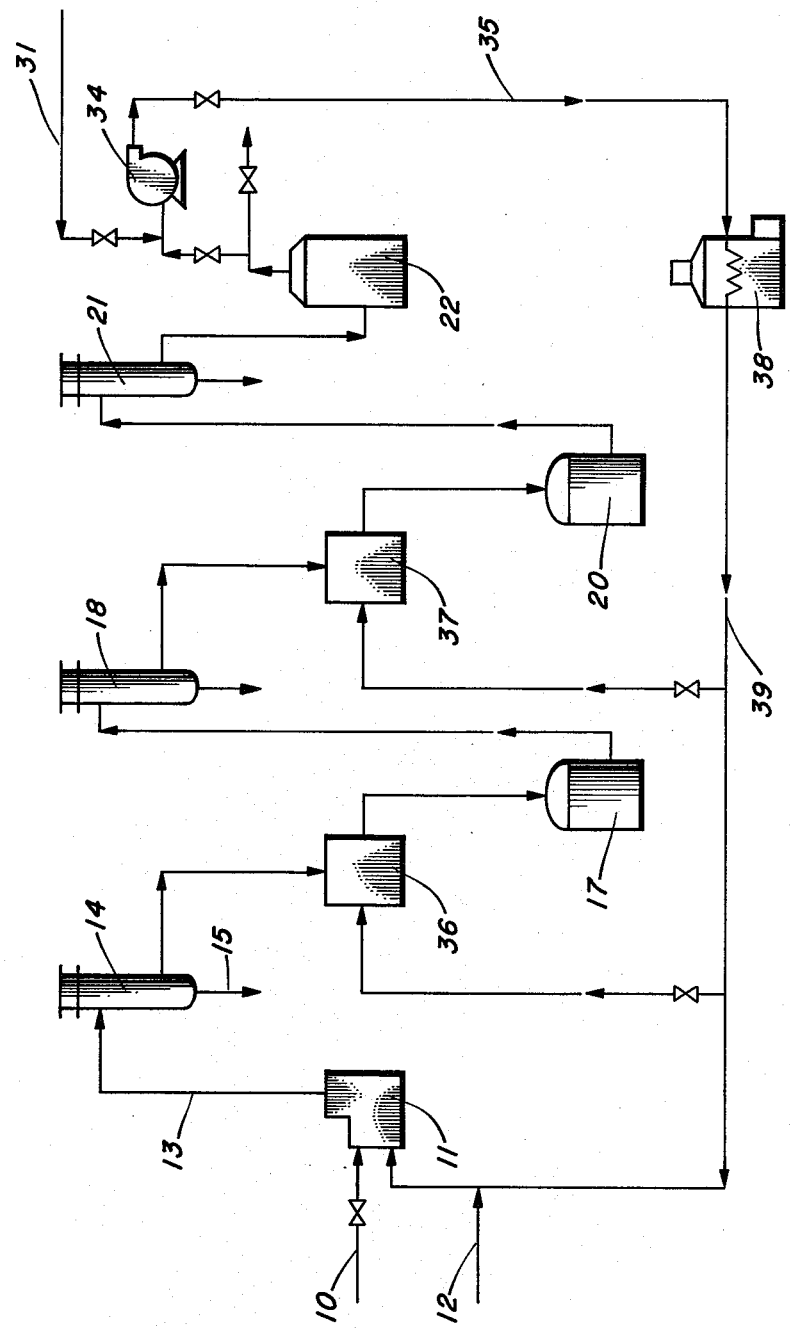
FIG. 3 is a schematic flow diagram illustrating an alternative version of the invention in which no tail gas unit is utilized.

A simplified embodiment of the invention, wherein no tail gas treatment is involved, is shown in FIG. 3. The embodiment in FIG. 3 is substantially identical to the FIG. 2 embodiment except that inert gas from blower 34 goes directly to furnace 38 via line 35. In the embodiments illustrated in FIGS. 2 and 3, the circulating gas to blower 34 may be at about 140° C., requiring a blower capable of handling such temperature.

It will be seen that the heat-up process in accordance with the invention prevents formation of pollutants by maintaining an oxygen-free system during heat-up. The process of the invention eliminates the necessity for introduction of oxygen to the sulfur recovery plant during the heat-up procedure, whereas prior art heat-up processes, even those which use inert gas as a heat sink, all involve introduction of oxygen to the sulfur recovery plant with resultant disadvantages.

Numerous modifications and variations to the specific plants and processes described in detail above will be apparent to those skilled in the art. The essential feature of the invention is the provision for heating up a sulfur recovery plant prior to start-up by a process which maintains an oxygen-free system.

We claim:

1. A process for heating up a modified Claus type sulfur recovery plant, comprised of a reaction furnace, a plurality of condensers, a plurality of catalytic converters, and heating means between at least one of said condensers and converters, prior to putting the plant on stream comprising:
    (a) purging the plant with an inert gas;
    (b) blocking in the purged plant; and
    (c) circulating essentially inert gas through the blocked in plant while heating the circulating inert gas in an inert gas heating furnace prior to introducing heated circulating inert gas to said reaction furnace.

2. The process of claim 1 wherein said heated circulating inert gas is also heated by said heating means between at least one of said condensers and converters.

3. The process of claim 1 wherein said inert gas is introgen.

4. The process of claim 1 wherein said plant includes a SCOT unit comprised of a furnace, a reactor, a quench tower and an absorber tower and said heated circulating inert gas passes through said modified Claus plant, then through at least part of said SCOT unit and then to said inert gas heating furnace.

* * * * *